(12) United States Patent
Mead et al.

(10) Patent No.: US 9,996,692 B2
(45) Date of Patent: Jun. 12, 2018

(54) METHOD AND SYSTEM FOR USING PRINCIPAL COMPONENTS ANALYSIS (PCA) TO DISPLAY TRENDS IN AIRCRAFT CYBER EVENTS IN REAL TIME

(71) Applicant: The Boeing Company, Huntington Beach, CA (US)

(72) Inventors: Jadranka Mead, Renton, WA (US); James E. Vasatka, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 319 days.

(21) Appl. No.: 14/819,974

(22) Filed: Aug. 6, 2015

(65) Prior Publication Data

US 2017/0039370 A1 Feb. 9, 2017

(51) Int. Cl.
*G06F 21/55* (2013.01)
*H04L 29/06* (2006.01)
*H04L 29/08* (2006.01)

(52) U.S. Cl.
CPC ........ *G06F 21/554* (2013.01); *H04L 63/1425* (2013.01); *H04L 67/12* (2013.01)

(58) Field of Classification Search
CPC ............. H04L 63/1408; H04L 63/1416; H04L 63/1425; H04L 63/1433; H04L 63/1441; H04L 67/12; G06F 21/55; G06F 21/554; G06F 21/56; G06F 21/566
See application file for complete search history.

(56) References Cited

U.S. PATENT DOCUMENTS

| | | | | |
|---|---|---|---|---|
| 7,689,383 B2* | 3/2010 | Black | ................. | G05B 23/0294 702/183 |
| 8,811,616 B2* | 8/2014 | Cabos | .................. | H04L 9/0825 380/270 |
| 9,369,484 B1* | 6/2016 | Lacerte | ............... | H04L 63/1441 |
| 9,591,009 B2* | 3/2017 | Craig | ................. | H04L 63/1416 |
| 2003/0027550 A1* | 2/2003 | Rockwell | .......... | B64D 45/0015 455/410 |
| 2009/0216393 A1* | 8/2009 | Schimert | ............ | G05B 23/0251 701/14 |
| 2011/0112878 A1* | 5/2011 | Isom | ................ | G06Q 10/06311 705/7.13 |

(Continued)

*Primary Examiner* — Benjamin E Lanier
(74) *Attorney, Agent, or Firm* — MH2 Technology Law Group LLP

(57) ABSTRACT

A system, method, and computer readable media for using principal components analysis (PCA) to graphically display cyber event information about an aircraft or fleet of aircraft. A ground-based security module collects historical cyber log data about the aircraft and performs PCA on the historical data to derive two principal components and their corresponding loading vectors. The loading vectors are transmitted to an air-based security module on the aircraft. The air-based security module collects real time cyber log data, computes numerical scores associated with the loading vectors on board the aircraft while the aircraft is in flight, and transmits the numerical scores to the ground-based module. The ground-based module graphically displays a comparison of the numerical scores to the corresponding loading vectors for the historical log data on a biplot to reveal trends in the cyber health of the aircraft.

6 Claims, 4 Drawing Sheets

(56) References Cited

U.S. PATENT DOCUMENTS

2014/0013431 A1* 1/2014 Bush ................... G06F 21/00
                                                    726/23
2014/0380485 A1* 12/2014 Ayyagari ............ H04L 63/1433
                                                    726/25

* cited by examiner

METHOD AND SYSTEM FOR USING PRINCIPAL COMPONENTS ANALYSIS (PCA) TO DISPLAY TRENDS IN AIRCRAFT CYBER EVENTS IN REAL TIME

TECHNOLOGICAL FIELD

The present disclosure relates generally to cybersecurity detection and management systems used in connection with aircraft and, in particular, to a system and method for using principal components analysis to display trends in cyber events on-board the aircraft in real time.

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections and computing systems. These cyber event mitigation efforts require detection and response both during and after the cyber event.

In order to detect when cyber events occur, there is a need for assessing in real-time the cyber health of the aircraft and the air-traffic related computing and network environment. However, prior art solutions for aircraft cyber intelligence require complex algorithms and computing power which is not available on board while the aircraft is in flight. Also, it is not feasible for the aircraft to send all cyber log data to the ground because of the associated cost given the offboard bandwidth limitations. Furthermore, using prior art cyber analytics techniques, which analyze in depth and display each feature of cyber assessment in a separate display, it would take hundreds of graphs to graphically display cyber data for the more than 2000 airplanes that are in flight over the United States at any given time. Lastly, the traffic from the aircraft to the ground is encrypted and, in order to decrypt the traffic with the keys used for on-board systems, traffic performance can be negatively impacted. This makes it undesirable to decrypt the traffic in real time, which is required for logging traffic for proper cyber event inspection.

Thus, it is desirable to have an improved system and method for assessing and displaying in real time the cyber health of an aircraft while in flight.

BRIEF SUMMARY

In view of the foregoing background, example implementations of the present disclosure provide a system and method for using principal components analysis (PCA) to graphically display cyber event information about at least one aircraft. The method includes the steps of collecting in a ground-based security module historical cyber log data about the aircraft, performing PCA on the historical cyber log data to derive two principal components and their corresponding loading vectors, transmitting the loading vectors from the ground-based security module to the aircraft, collecting real time cyber log data for the aircraft while the aircraft is in flight, computing numerical scores associated with the loading vectors on board the aircraft while the aircraft is in flight based on the loading vectors and the real time cyber log data, transmitting the numerical scores to the ground-based security module, and graphically displaying in the ground-based security module a comparison of the numerical scores to the corresponding loading vectors for the historical log data to reveal trends in the cyber health of the aircraft. The method further includes the step of transmitting the loading vectors from the ground-based security module to the aircraft prior to takeoff and using PCA to graphically display cyber event information about at least a fleet of aircraft. The displaying step includes displaying the comparison on a biplot.

A system for using principal components analysis (PCA) to graphically display cyber event information about at least one aircraft is provided including a ground-based security module that collects historical cyber log data about the aircraft, performs PCA on the historical cyber log data to derive two principal components and their corresponding loading vectors, and transmits the loading vectors to the aircraft. An air-based security module collects real time cyber log data for the aircraft while the aircraft is in flight, computes numerical scores associated with the loading vectors on board the aircraft while the aircraft is in flight based on the loading vectors and the real time cyber log data, and transmits the numerical scores to the ground-based security module. The ground-based security module graphically displays a comparison the numerical scores to the corresponding loading vectors for the historical log data to reveal trends in the cyber health of the aircraft.

A computer-readable storage medium for using principal components analysis (PCA) to graphically display cyber event information about at least one aircraft is further provided. The computer-readable storage medium is non-transitory and has computer readable program code portions stored therein that, in response to execution by one or more central processing units (CPUs) and or more additional CPUs, cause a computer system to at least collect in a ground-based security module historical cyber log data about the aircraft, perform PCA on the historical cyber log data to derive two principal components and their corresponding loading vectors, transmit the loading vectors from the ground-based security module to the aircraft, collect real time cyber log data for the aircraft while the aircraft is in flight, compute numerical scores associated with the loading vectors on board the aircraft while the aircraft is in flight based on the loading vectors and the real time cyber log data, transmit the numerical scores to the ground-based security module, and graphically display in the ground-based security module a comparison of the numerical scores to the corresponding loading vectors for the historical log data to reveal trends in the cyber health of the aircraft.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
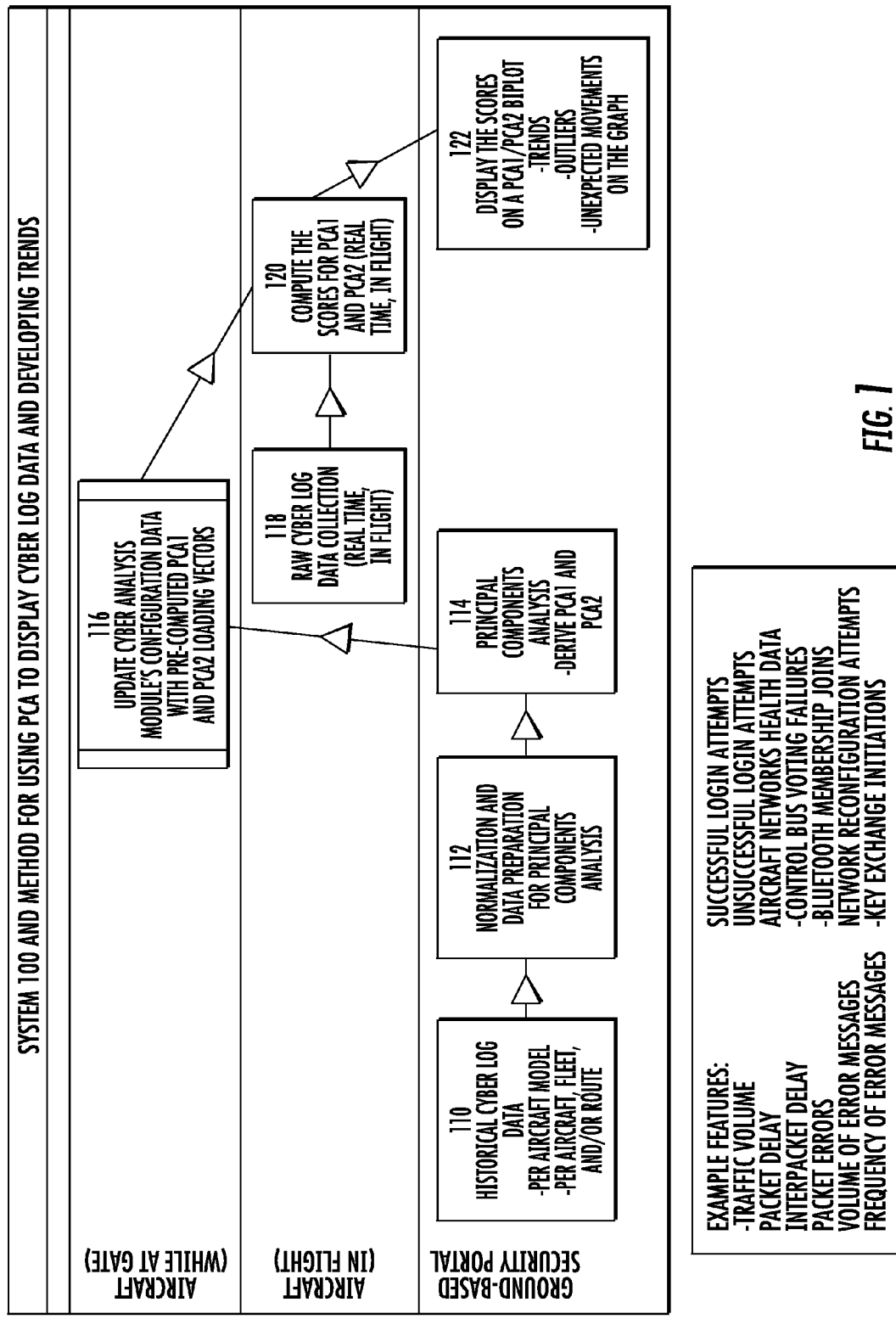
FIG. 1 is a flowchart for the method and system for using PCA to display aircraft cyber log data in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to the example implementations of the present disclosure, and as shown in FIG. 1, a system 100 and method for using a modified Principal Components Analysis (PCA) is provided for quickly identifying trends in cyber event awareness on an aircraft while it is in flight, and communicating such trends to the ground based security module using minimal bandwidth. As used herein, the term "cyber event" pertains to any malicious or suspicious event that compromises, or attempts to compromise, the operation of an aircraft's network, including its data connections and computing systems.

PCA is a well known statistical technique used for uncovering hidden insights in observed data and reducing the dimensionality of large data sets. Specifically, PCA is a technique that seeks to find a few linear combinations of an original set of variables that best describe a data set, "best" being mathematically/statistically defined and not necessarily being defined by human interpretation. PCA partitions observable data into areas that are separated by a hyperplane of dimension n in a space n+1, for a data set of observables that itself is representable in an n+1 dimensioned space. Thus, PCA is used for computations on large data sets and produces several principal components for a specific input data set. If PCA were used in its intended manner as just described in an aircraft cybersecurity context, the PCA would produce a different graph each time new real data is added to the set of observations, and the graph would not be comparable to a previous graph to discern cybersecurity trends such as a deterioration in cyber health on the aircraft while in flight. Additionally, it is not feasible to use PCA in its intended manner to analyze large sets of real-time dynamic data when the data is not a linear combination of features and is not linearly separable by a low dimension hyperplane, as is the case with log data collected on an aircraft that is in flight. For these reasons, prior art PCA has not been used for analysis of real-time log data.

There are several characteristics of an operating environment on-board an aircraft in flight, including the aircraft's log data, that can be exploited by a repurposed use of PCA, as explained further below. Examples of such aircraft-specific network characteristics are:
 1. Avionics and operational data aircraft systems are deterministic or nearly deterministic, and generate data whose flows are deterministic or nearly deterministic when the aircraft is operating under normal conditions.
 2. It is expensive to run complex analytic processing on an aircraft itself and the personnel expertise needed to interpret the deep results of complex analytics is typically not available on board during flight.
 3. It is undesirable to send detailed aircraft log data (with potentially secret details of data flows, etc.) to the ground based security module because the data could be compromised. It is furthermore expensive and impractical for the aircraft to send all collected data to the ground-based module because the data gets collected in real time.
 4. The updates and certification of software on-board the aircraft are minimal so simple solutions are best suited for this environment.
 5. Constant, frequent, continuous real-time updates of general conditions, even with minor deviations from the norm so far as one aircraft is concerned, are important for uncovering cyber attacks that might be under way in a timely manner.
 6. Summarization of minor per-aircraft deviations from the historically observed norm may uncover fleet-wide cyber attacks, which necessitates that aircraft send frequent updates to a coordination and monitoring center.

In example implementations of the present disclosure, prior art PCA is repurposed for use in an aircraft cybersecurity context to leverage the characteristics of aircraft systems as described in (1) above, satisfy the constraints of aircraft systems as described in (2)-(4) above, and still accomplish the cybersecurity assessment goals described in (5)-(6) above.

Referring now to FIG. 1, the repurposed PCA is first applied in the ground-based security module to historical log data on a per aircraft-model basis, per fleet basis, per route flied basis, and/or per airline basis (step 110). Given the computing power and bandwidth available in the ground-based security module, PCA can be applied to thousands of flights and several hundred log data features such as packet volume, packet delay, error rates, membership voting events for certain buses, network dropouts for Bluetooth, and other on-board and bus-specific features (step 112). Adding additional features to the PCA does not necessarily increase the complexity of the solution.

As an output from the PCA applied to the historical log data features (steps 110 and 112), two top principal components are selected on the ground to succinctly describe the historical log data (step 114). The PCA algorithm computes linear combinations of historical log data features which best describe the historical data set. When these linear combinations of features (or, "principal components") are plotted as vectors on a two-dimensional biplot graph, the log data values represented by the two top principal components will show the greatest possible variance in this two-dimensional plane, and the first principal component is the line in the space that is closest to the log data (observations) using average squared Euclidian distance as a measure of closeness. Due to these two characteristics of the PCA, when the deviations from the normal historical graph occurring during actual real-time operation of a particular aircraft, fleet or region, are plotted on the same two-dimensional biplot graph used for the historical log data, the visual separation of points on this graph allows a human operator to note, visualize and track this behavior, and deviation from it, in easy way.

Loading vectors PCA1, PCA2, which are two simple linear equations, are shared by the ground based security module with the aircraft's on board computing network (specifically, the aircraft's cyber log module) prior to the aircraft taking off (step 116). PCA1 and PCA2 can also be shared with the aircraft for long periods of time, such as between regular software upgrades. During flight, raw cyber log data is collected by the aircraft's on board network in real time (step 118). Numerical scores for PCA1 and PCA2 are then computed in real time on board the aircraft using negligible computing resources based on the raw cyber log data and the preloaded loading vectors PCA1, PCA1 (step 118). Software used for computing PCA1 and PCA2 scores can be verified and certified, per Federal Aviation Administration (FAA) regulations.

The numerical scores for PCA1 and PCA2 well summarize the aircraft's raw cyber log data and are sensitive to changes in underlying data features. Thus, when the aircraft shares only two numerical scores for PCA1 and PCA2 with the ground-based security module at regular intervals during the flight, the scores can be encoded in as little payload as one byte, thereby requiring minimal computing power and minimal bandwidth to send the scores to the ground-based module. Such numerical scores for PCA1 and PCA2 provide a suitable approximation and substitute for sending an entire log of data collection from the aircraft to the ground-based module in a continuous manner. Further, because the aircraft's on board security module shares only the two numerical scores for PCA1 and PCA2 with the ground-based security module, the specifics of any individual cyber event are not revealed in transit even if the link gets compromised. Specifically, the underlying raw data, such as data about the type of air traffic or aircraft cyber health, that contributed to the numerical scores remains masked. The equation and the actual numerical scores shared cannot be reverse engineered to obtain the data flow details or any other events that were included in the equation. Accordingly, any adverse impact on network traffic performance associated with decryption of cyber event sharing is minimized.

Figure 2:
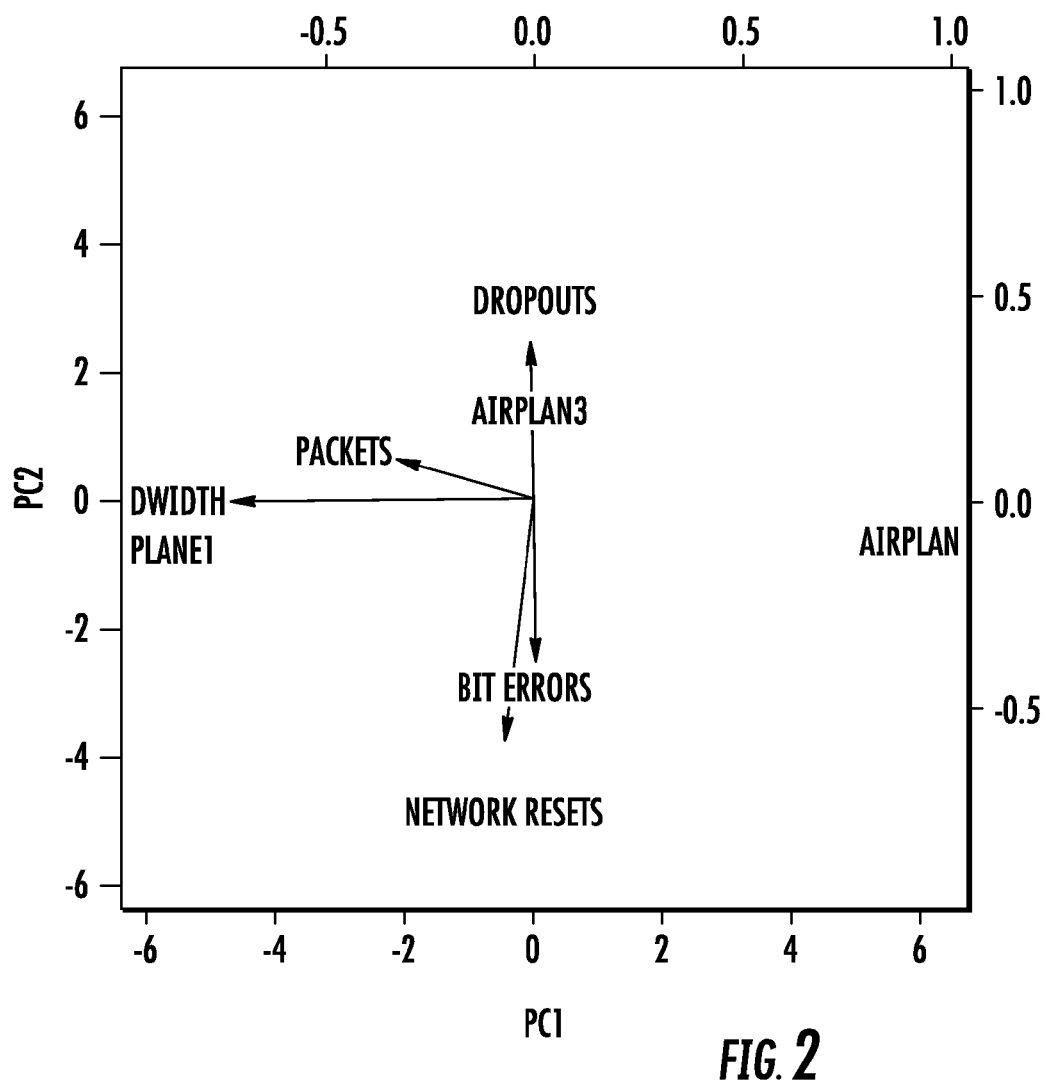
FIG. 2 is a graphical representation of PCA scores collected from multiple aircraft in accordance with an example implementation of the present disclosure.

In the ground-based security module, PCA1 and PCA2 are graphically displayed in a manner that is easy to follow (step 122), such as on a per aircraft basis, per fleet basis, and/or per region basis. Multiple aircraft and the features that are essential to aircraft cyber health can be plotted on one biplot type of display, as shown in FIG. 2, in order to detect in real time cyber attacks that may be spread across a number of aircraft but are undetectable on any one individual aircraft. The graphical display makes deviations from the norm (as established in step 114 based on historical log data) easy to identify because of the inherent characteristics of PCA. Namely, the principal component directions in feature space are such that along those directions the original data is highly variable and the orthogonality of PCA2 (uncorrelated features characteristic) makes it easy to spot negative trends in cyber event situations on board the aircraft. By using the PCA algorithm, only about 20 graphs are needed to individually track each of about 2,000 aircraft across a plethora of features, simultaneously, because all the combinations of the features are already accounted for in the PCA scores provided by the aircraft to the ground-based security module.

The invention, as described above, significantly improves the detection of aircraft cyber events by repurposing PCA to compute PCA scores. The resulting system and method is fast and simple to compute, simple to certify, requires low traffic volume for real time computations, enables substantially continuous updates, masks individual aircraft cyber health information, provides real time tracking, and facilitates graphical detection of deviations from the norm.

According to example implementations of the present disclosure, the various components of the system 100 may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system 100 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g, storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the backend system 102. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 3:
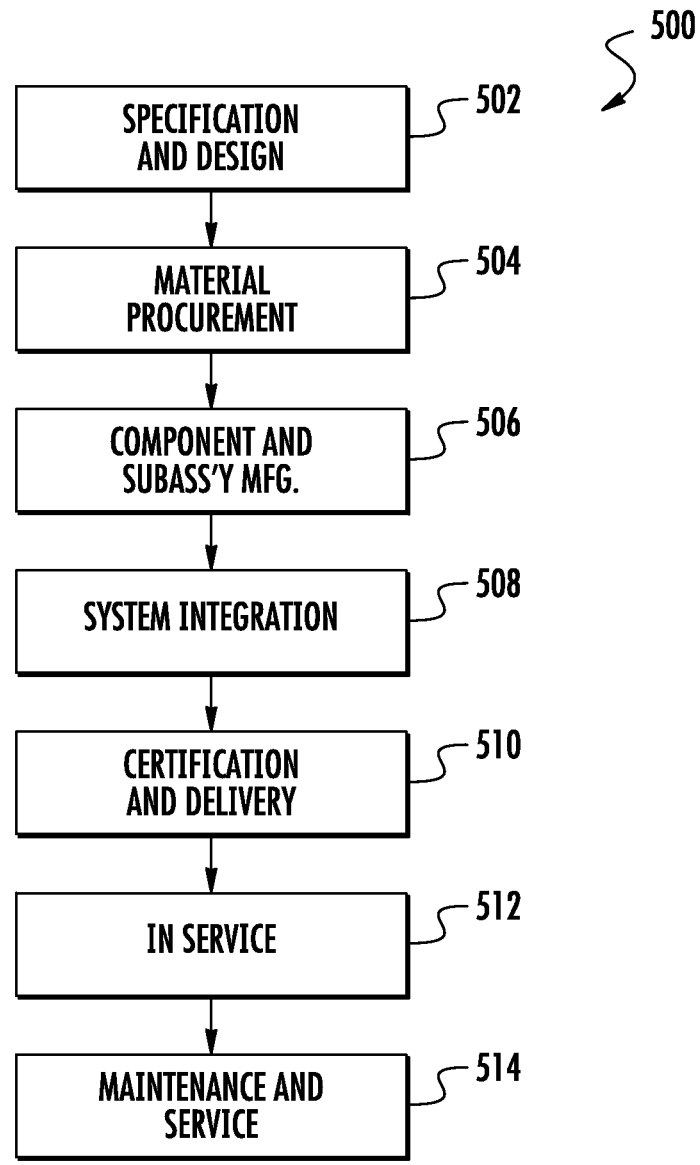
FIG. 3 is a block diagram of aircraft production and service methodology.
Figure 4:
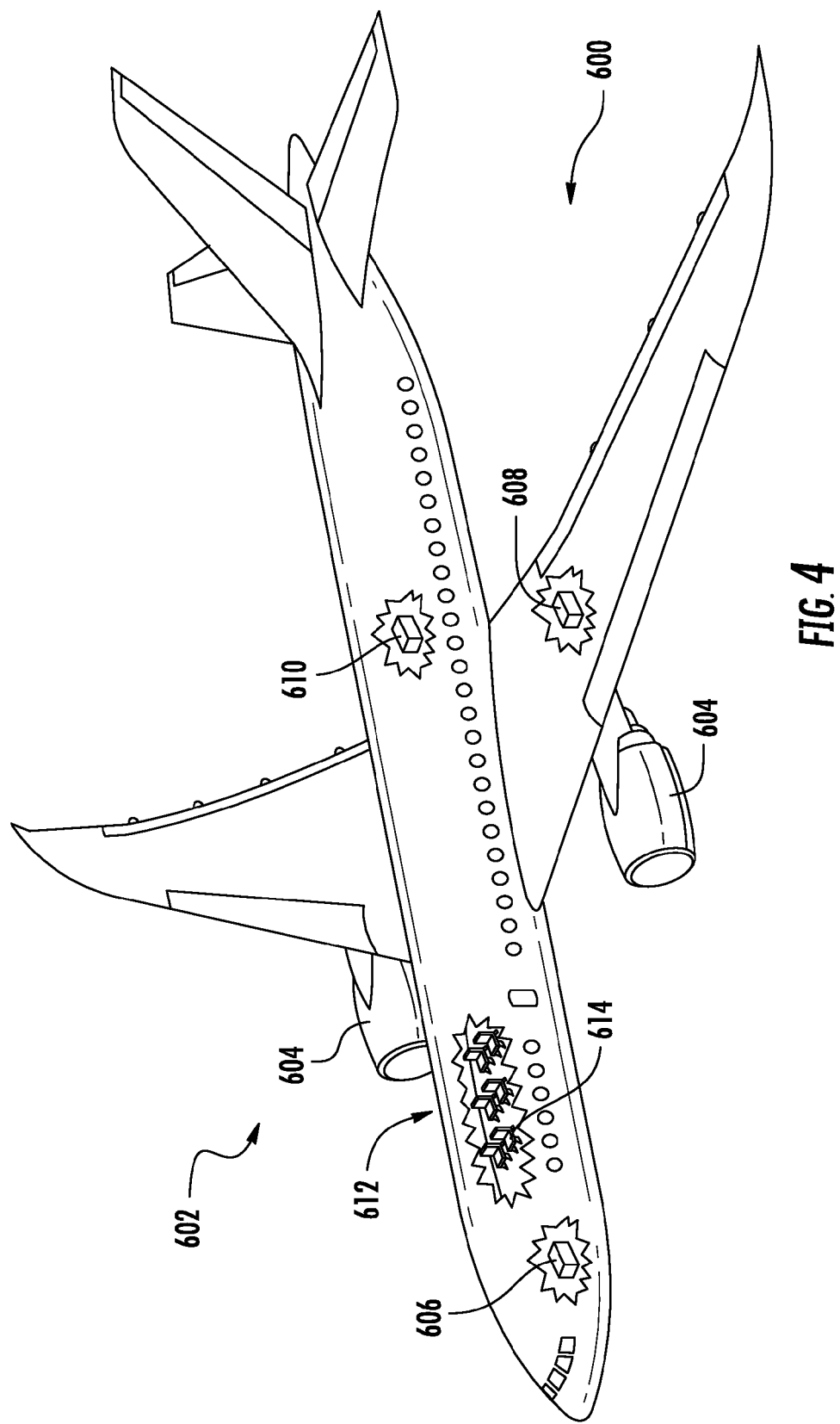
FIG. 4 is a schematic illustration of an aircraft.

As referenced above, examples of the present disclosure may be described in the context of aircraft manufacturing and service. As shown in FIGS. 3 and 4, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for using principal components analysis (PCA) to graphically display cyber event information about at least one aircraft comprising the steps of:
   collecting in a ground-based security module historical cyber log data about the aircraft;
   performing PCA on the historical cyber log data to derive two principal components and their corresponding loading vectors;
   transmitting the loading vectors from the ground-based security module to the aircraft;
   collecting real time cyber log data for the aircraft while the aircraft is in flight;
   computing numerical scores associated with the loading vectors on board the aircraft while the aircraft is in flight based on the loading vectors and the real time cyber log data;
   transmitting the numerical scores to the ground-based security module;
   graphically displaying in the ground-based security module a comparison of the numerical scores to the corresponding loading vectors for the historical log data to reveal trends in the cyber health of the aircraft; and
   responding to at least one cyber event based on the trends in the cyber health of the aircraft.

2. The method of claim 1 further comprising the step of transmitting the loading vectors from the ground-based security module to the aircraft prior to takeoff.

3. The method of claim 1 further comprising the step of using PCA to graphically display cyber event information about at least a fleet of aircraft.

4. The method of claim 1 wherein the displaying step comprising displaying the comparison on a biplot.

5. A system for using principal components analysis (PCA) to graphically display cyber event information about at least one aircraft comprising:
   ground-based security module that
      collects historical cyber log data about the aircraft;
      performs PCA on the historical cyber log data to derive two principal components and their corresponding loading vectors; and
      transmits the loading vectors to the aircraft; and
   an air-based security module that
      collects real time cyber log data for the aircraft while the aircraft is in flight;
      computes numerical scores associated with the loading vectors on board the aircraft while the aircraft is in flight based on the loading vectors and the real time cyber log data; and
      transmits the numerical scores to the ground-based security module;
   wherein the ground-based security module graphically displays a comparison the numerical scores to the corresponding loading vectors for the historical log data to reveal trends in the cyber health of the aircraft, whereby a user responds to at least one cyber event based on the trends in the cyber health of the aircraft.

6. A computer-readable storage medium for using principal components analysis (PCA) to graphically display cyber event information about at least one aircraft, the computer-readable storage medium being non-transitory and having computer readable program code portions stored therein that, in response to execution by one or more central processing units (CPUs) and or more additional CPUs, cause a computer system to at least:
   collect in a ground-based security module historical cyber log data about the aircraft;
   perform PCA on the historical cyber log data to derive two principal components and their corresponding loading vectors;
   transmit the loading vectors from the ground-based security module to the aircraft;
   collect real time cyber log data for the aircraft while the aircraft is in flight;
   compute numerical scores associated with the loading vectors on board the aircraft while the aircraft is in flight based on the loading vectors and the real time cyber log data;
   transmit the numerical scores to the ground-based security module; and
   graphically display in the ground-based security module a comparison of the numerical scores to the corresponding loading vectors for the historical log data to reveal trends in the cyber health of the aircraft, whereby a user responds to at least one cyber event based on the trends in the cyber health of the aircraft.

* * * * *